Figure 1:
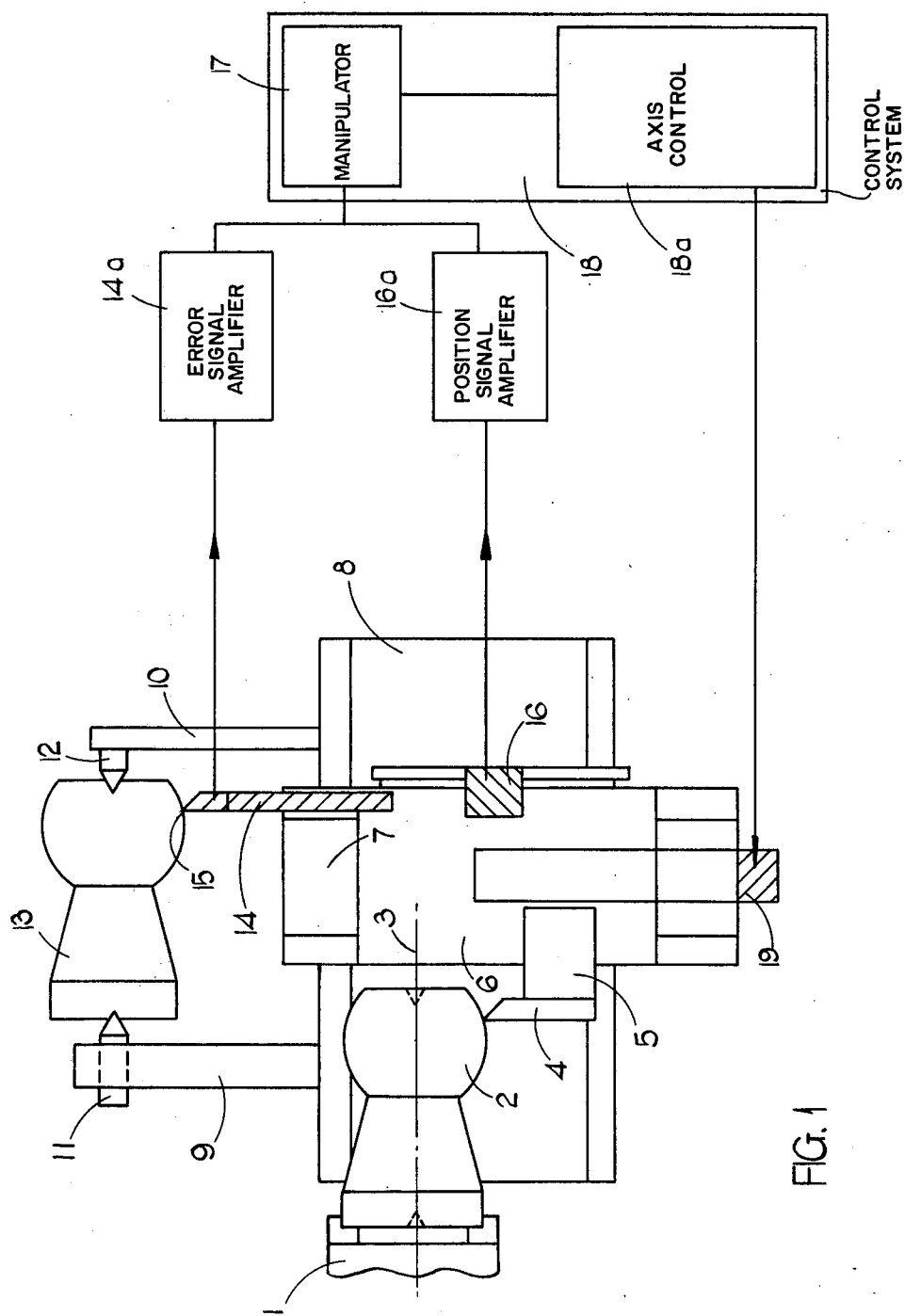

United States Patent [19]

Harman

[11] 4,038,591
[45] July 26, 1977

[54] AUTOMATIC MACHINE TOOL AND METHOD OF OPERATION

[75] Inventor: Julius Harman, Baginton, England

[73] Assignee: Alfred Herbert Limited, Coventry, England

[21] Appl. No.: 597,558

[22] Filed: July 21, 1975

[30] Foreign Application Priority Data

July 26, 1974 United Kingdom ............... 33026/74

[51] Int. Cl.$^2$ .............................................. G05B 17/36
[52] U.S. Cl. .................................... 318/578; 318/632
[58] Field of Search ............................... 318/578, 632; 51/165 TP, 165.71, 165.88; 235/151.13, 151.3

[56] References Cited

U.S. PATENT DOCUMENTS 3,898,440  8/1975  Fukuma et al. ................. 235/151.13
3,916,571  11/1975  Seidel .............................. 318/578 X

OTHER PUBLICATIONS

"Role of Statistical Computation in Machine–Tool Feedback Gaging," David N. Smith, Control Engineering, Sept., 1957, pp. 190–196.

*Primary Examiner*—James R. Scott
*Assistant Examiner*—John J. Feldhaus

[57] ABSTRACT

An automatic machining process using a programmed machining cycle, in which process a component previously machined according to the program is used to sense deviations from the expected component shape, such deviations being employed to effect corrective tool off-sets in the aforesaid or a subsequent machining cycle. The invention also embraces a machine tool capable of performing this process.

14 Claims, 2 Drawing Figures

AUTOMATIC MACHINE TOOL AND METHOD OF OPERATION

This invention relates to the automatic machining of workpieces and particularly to the control of such machining in a numerically controlled machine tool.

It is known that components produced by machining workpieces automatically according to even the most precisely formulated programmes can vary in dimensions in a random manner under the influence of numerous possible variables. It has, for example, been established that effects due to heat generated during a machining process, both at the machining interface and in the machine tool as a whole, can lead to very complex geometrical distortions affecting the tool, the workpiece and consequently the entire machining geometry. Moreover, conditions at the machining interface can vary as the result of material variations in the tool or component, and such changing conditions can also result in a machined component differing from the desired shape. Examples of other factors having an effect on component size are the choice of coolant, the depth of cut, swarf flow from the workpiece, cutting speed and feed rate, as will be recognised by those skilled in the art.

In order to obtain tolerably consistent component dimensions from a given programme, it is therefore necessary to provide a monitoring facility to enable appropriate adjustments in the machine tool and/or its control system to be made to correct any excessive variation in component dimensions. Such adjustments are referred to in the art and hereinafter as "tool offsets".

An object of the invention is to provide an improved machining process and apparatus in which improved monitoring and correction of deviations in component dimensions is provided.

According to the invention, there is provided an automatic machining process wherein a member is moved automatically through a machining cycle according to a predetermined programme, and arranged to cause a monitoring device to be correspondingly traversed in a path determined by the programme over a component previously machined according to the programme, whereby deviations from the expected component shape appearing in the component are sensed and used to effect a corresponding corrective tool off-set in the aforesaid or a subsequent machining cycle.

Th desirability of in-process gauging, providing an immediate tool adjustment to correct a sensed differential between the dimensions of the actual and desired component sizes, has long been recognised. However, it has been thought necessary hitherto to measure the workpiece during the machining process and this has proved unsatisfactory due to the continual and rapid changes in conditions occurring during the cutting process. It will be appreciated that a surface being machined, subject as it is to continual change, offers no stable basis for comparative measurement purposes, and the situation is made worse by dynamic conditions of vibration and deformation occurring at the surface. Furthermore, any such measurement would occur at a specific time and position on the component so that a subsequent correction would not relate to the same set of co-ordinates.

Since the process of the invention does not require sensing from the workpiece being machined, in-process gauging can be contemplated and in one preferred example of the process, said member carries a tool which cuts a workpiece during said machining cycle, the cutting operation being accompanied by corresponding traverse of the monitoring device over a component previously machined according to the programme, whereby said deviations are sensed and used to produce instantaneous tool off-sets in order to correct the machining of the workpiece under cut.

Preferably, the detection of a deviation results in the production of an electrical signal representative of the deviation, which signal is translated into a movement of a tool to produce a corresponding corrective tool off-set.

From another aspect, the invention resides in an automatic machine tool capable of performing a machining cycle automatically according to a predetermined programme, said machine tool including means for supporting a component previously machined according to said programme and monitoring means arranged to traverse said component in a path determined by the programme whereby deviation from the expected component shape appearing in the component are sensed, means for converting sensed deviations into error signals and correcting means responsive to said signals to effect corrective tool off-sets in the aforesaid or a subsequent machining cycle.

Preferably, the monitoring means is a mechanical follower for engagement with a surface of said previously machined component, said follower being coupled to a tool arranged to perform a working operation on a workpiece in accordance with said programme, whereby movement of the tool causes corresponding movements of the follower over said component surface to sense deviations from the expected component shape, the resulting signals being fed to the correcting means which produces instantaneous corrective tool off-sets.

In a convenient arrangement, the follower is mounted on a carrier for said tool.

Figure 2:
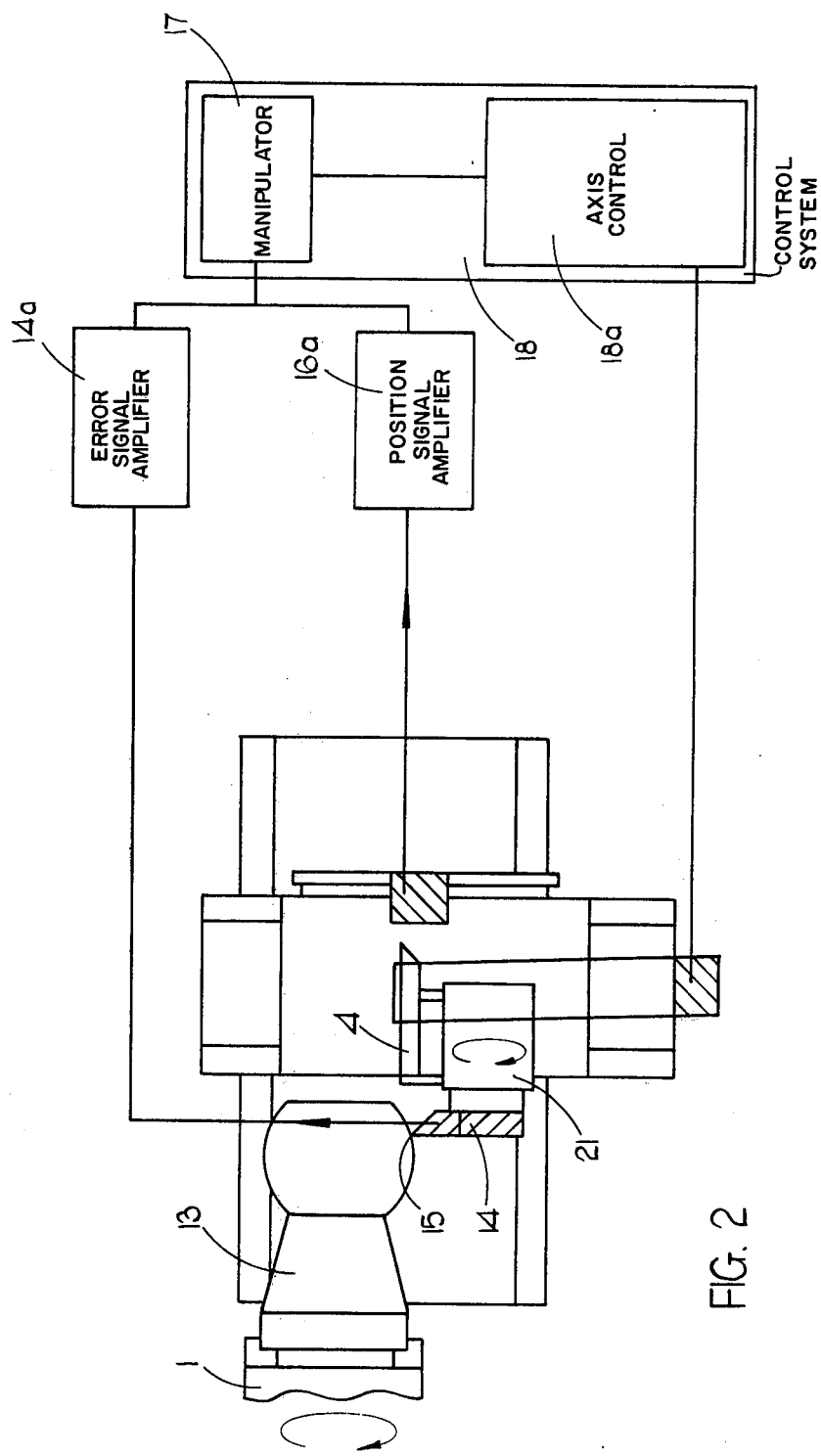

The invention will now be described, by way of example, with reference to the accompanying diagrammatic drawings in which:

FIG. 1 shows part of a machine tool of the invention having a dimension monitoring device and associated control system, and FIG. 2 shows part of an alternative embodiment of the machine tool of the invention.

Referring to FIG. 1 of the drawings, this shows a lathe including a chuck 1 supporting a workpiece 2 for rotation about an axis 3. A cutting tool 4 is mounted in a tool support 5 carried on a cross-slide 6 mounted on a saddle 7 which is itself mounted for longitudinal sliding movement on a bed 8 of the machine.

The bed 8 is provided with a pair of longitudinally spaced projecting brackets or the like 9, 10 carrying respective centres 11, 12 for supporting a component 13 produced by a previously performed machining cycle according to the programme and which will be used to control the machining of the workpiece 2 now in the chuck.

Mounted on the cross-slide 6 is a follower 14, the tip 15 of which engages the surface of the component 13. The follower 14 is arranged for longitudinal sliding movement relative to the cross-slide 7 against suitable resilient bias and is associated with means, such as an electro-mechanical transducer, which produces an electrical signal varying in accordance with the amount of movement impressed upon the follower. As the tool 4 is moved to machine the workpiece 2 in accordance with the desired programme, which, in this case, is the programme used to produce the component 13, the follower 14 will be correspondingly moved relative to the surface of the component 13. If, during performance of a cycle according to this programme, one or a combination of variables has produced in the component 13 a deviation from the desired shape thereof, as determined by the programme, the follower will slide in one direction or the other depending upon the nature of the deviation and an error signal representing this deviation will be produced by the transducer.

The saddle 7 carries a reader 16 which produces an electrical signal as a function of the position of the saddle in relation to the axis 3, which signal will be referred to as the position signal. The position and error signals arising during a machining cycle are amplified by amplifiers represented respectively at 14a and 16a and fed to an electronic manipulator 17 which provides a summation of the two signals and feeds this via an electronic control system 18, to drive control means 19 which continuously imposes the required off-set movement on the cross-slide to compensate for sensed deviations. The manipulator 17 and the control system 18, which latter includes a circuit 18a for generating a signal for application to the drive control, are composed of conventional electronic circuits as will be familiar to one skilled in the art.

The drive means 19 comprises mechanisms for selectively introducing a change in the velocity, including acceleration control, of the slide through changing energy levels of a control mechanism such as a servo valve involving a positional change of, for instance, the size of an orifice for the control of fluid displacement. Drive means 19 can alternatively comprise motors responsive to step by step control in accordance with pulse generation of varying frequency so as to produce changes in speed, and thereby control of the progress of a slide.

Drive means 19 can include a D.C. or A.C. speed motor and leadscrew for the change in feed-rate or the fast traverse of a toolslide.

In the example described, the drive control means actuates servo valves which control one or more hydraulic cylinders operatively associated with the cross-slide for feeding the tool. When the follower senses that the component 13 is too large, the drive control means acts to cause the tool 4 to increase its depth of cut by an amount corresponding to the excess dimension sensed in the component 13. Converse action takes place when the component 13 is sensed as being too small.

In the particular arrangement shown, in which the follower 14 and tool 4 are engaged on the same side respectively of the component 13 and workpiece 2, it will be appreciated that corrective movement of the tool 4 will produce a corresponding movement of the follower 14 and it is therefore necessary to arrange for the corrective movement to be one half of that indicated as necessary by the follower. This arrangement doubles the reading accuracy of the probe but it produces a shift in the datum or zero position of the follower which must be continually compensated for during the machining cycle. This can be done automatically by appropriate circuitry in the control system.

In an alternative arrangement, the follower and tool are arranged on opposite sides respectively of the component and workpiece so that movement of the follower in one direction due to a deviation in the component 13 would produce a corresponding movement of the tool 4 in the same direction. Thus, the position of equilibrium of the new tool position produces no error signal and the expected tool position and follower reading would coincide on the zero reading of the follower. This latter method is preferred for simplicity of manipulation, because no datum adjustment is necessary.

The principle of the invention can be applied to all machines in which tool position is controlled numerically, examples being lathes, machining centres, milling and grinding machines.

It will be appreciated that instead of applying the signals produced by the follower in a manner such as to produce instantaneous correction during a machining cycle, the signals could be fed to and stored in a memory bank and subsequently used to modify the programme by superimposing thereon tool off-sets which will apply corrective movement to the tool in a subsequent maching cycle.

An example of such a process is represented in FIG. 2 which shows, held in the chuck 1, a component 13 which has been machined to a desired programme, A turret 21 has, in one station thereof a tool 4 and in another station a probe 14, the end 15 of which engages the component. The cycle as determined by the programme is repeated with the probe in place of the tool as shown, and deviations from the expected shape of the component are recorded in a memory of the control system. During a subsequent machining cycle on a new workpiece, the memory can, via the drive control means, impose corrective off-sets on the tool to compensate for the sensed deviations. In the arrangement of FIG. 2, monitoring can be performed as a series of spot checks at selected points along the component, the location of the checks being determined by switch means associated with the follower and mounted for example, in the tool carrier.

It would be possible to sense, by the use of multidirectional or multiple probes, deviations in a number of axes simultaneously, instead of simply on component diameter as described. With a multi-directional probe, the error signal would be split up into two or more principal components by interpolation circuitry within the control system. However, the most significant errors occur in diameter of a component, such as coning effects in the machining of cylinders for example, and it is thought that only these errors would normally require correction. Sensing on diameter could also be performed in a direction other than parallel to tool feed, say at 45° to that direction, the follower then being coupled to the tool via an appropriate linkage.

I claim:

1. An automatic machining process for the production of a component according to a predetermined programme, comprising moving a member automatically through a machining cycle acording to said programme and simultaneously causing a monitoring device to be correspondingly traversed in a path determined by the programme over a component previously machined according to the programme, so as to sense deviations from the expected component shape appearing in the previously machined component, and using said deviations to effect corresponding corrective tool off-sets in one of the aforesaid and a subsequent machining cycle.

2. A process according to claim 1 wherein said member carries a tool which cuts a workpiece during said machining cycle, the cutting operation being accompanied by corresponding traverse of the monitoring device over a component previously machined according to the programme, whereby said deviations are sensed and used to produce instantaneous tool off-sets in order to correct the machining of the workpiece under cut.

3. A process according to claim 2 wherein the monitoring device is mechanically connected to said member for movement by the latter.

4. A process according to claim 2, wherein the detection of a deviation results in the production of an electrical error signal representative of the deviation, which signal is translated into a movement of a tool to produce a corresponding corrective tool off-set.

5. A process according to claim 4 wherein the electrical signals produced by deviations are stored in a memory and used to produce tool off-sets in a subsequent machining cycle.

6. A process according to claim 4 wherein an electrical position signal is produced which is a function of the tool position in relation to the workpiece, the position and error signals being combined to produce a summation of the two signals which is used to actuate a drive control means which continuously imposes the required tool off-set on the tool to correct for sensed deviations.

7. A process according to claim 2 wherein the monitoring device and tool are engaged on the same sides respectively of the previously machined component and the workpiece, and the corrective movement applied to the tool is one half of that imposed on the monitoring device.

8. A process according to claim 2, wherein the monitoring device and tool are engaged on opposite sides respectively of the component and workpiece and the corrective movement applied to the tool is equal to that imposed on the monitoring device.

9. An automatic machine tool capable of performing a machining cycle automatically according to a predetermined programme to produce a desired component, said machine tool including means for supporting a component previously machined according to said programme, monitoring means arranged to traverse said component in a path determined by the programme whereby deviation from the expected component shape appearing in the component are sensed, means for converting sensed deviations into error signals and correcting means responsive to said signals to effect corrective tool off-sets in one of the aforesaid and a subsequent machining cycle.

10. An automatic machine tool according to claim 9 wherein the monitoring means is a mechanical follower for engagement with a surface of said previously machined component, said follower being coupled to a tool arranged to perform a working operation on a workpiece in accordance with said programme, whereby movement of the tool causes corresponding movements of the follower over said component surface to sense deviations from the expected component shape, the resulting signals being fed to the correcting means which produces instantaneous corrective tool off-sets.

11. An automatic machine tool according to claim 10 wherein the follower is mounted on a carrier for the tool.

12. An automatic machine tool according to claim 10 wherein a position sensor is arranged to provide a position signal which is a function of the tool position in relation to the workpiece, means for combining the position and error signals to produce a summation, and drive control means operable in response to said summation of signals continuously to impose the required tool off-set on the tool to correct for sensed deviations.

13. An automatic machine tool according to claim 12 wherein said signals are electrical signals.

14. An automatic machine tool according to claim 12 wherein the drive control means actuates servo valves which control one or more hydraulic cylinders operatively associated with a tool slide.

* * * * *